United States Patent [19]

Cohen

[11] Patent Number: 4,822,284

[45] Date of Patent: Apr. 18, 1989

[54] EDUCATIONAL APPLIANCE FOR TEACHING HANDWRITING SKILLS

[76] Inventor: Martha G. Cohen, 18 W. Valley Brook Rd., Long Valley, N.J. 07853

[21] Appl. No.: 223,644

[22] Filed: Jul. 25, 1988

[51] Int. Cl.$^4$ .............................................. G09B 11/00
[52] U.S. Cl. ..................................................... 434/162
[58] Field of Search ............... 434/162, 163, 164, 165, 434/166

[56] References Cited

U.S. PATENT DOCUMENTS

| | | | |
|---|---|---|---|
| 46,827 | 3/1865 | Squier | 434/166 |
| 801,316 | 10/1905 | Barr | 434/164 |
| 1,061,913 | 5/1913 | Hughes | 434/164 |
| 3,425,140 | 2/1969 | Dillon et al. | 434/162 |

*Primary Examiner*—William H. Grieb
*Attorney, Agent, or Firm*—McAulay, Fields, Fisher, Goldstein & Nissen

[57] ABSTRACT

An educational appliance is disclosed for teaching children handwriting skills. The appliance includes a tablet which supports a sheet-like member having an inscribable surface. A clutch having an upright spindle is mounted to the tablet. The clutch includes a ratchet mechanism which is oriented to permit rotation of the spindle only in a counterclockwise direction. A transparent disc is removably mounted to the spindle for rotation therewith. The disc includes at least one aperture adapted to receive the pointed end of a writing implement. The operation is such that the writing implement inscribes a circle on the sheet that is sandwiched between the support surface of the tablet and the disc, during rotation of the disc about its axis of rotation, thereby instilling a habit in the child of drawing circles in a counterclockwise direction.

20 Claims, 1 Drawing Sheet

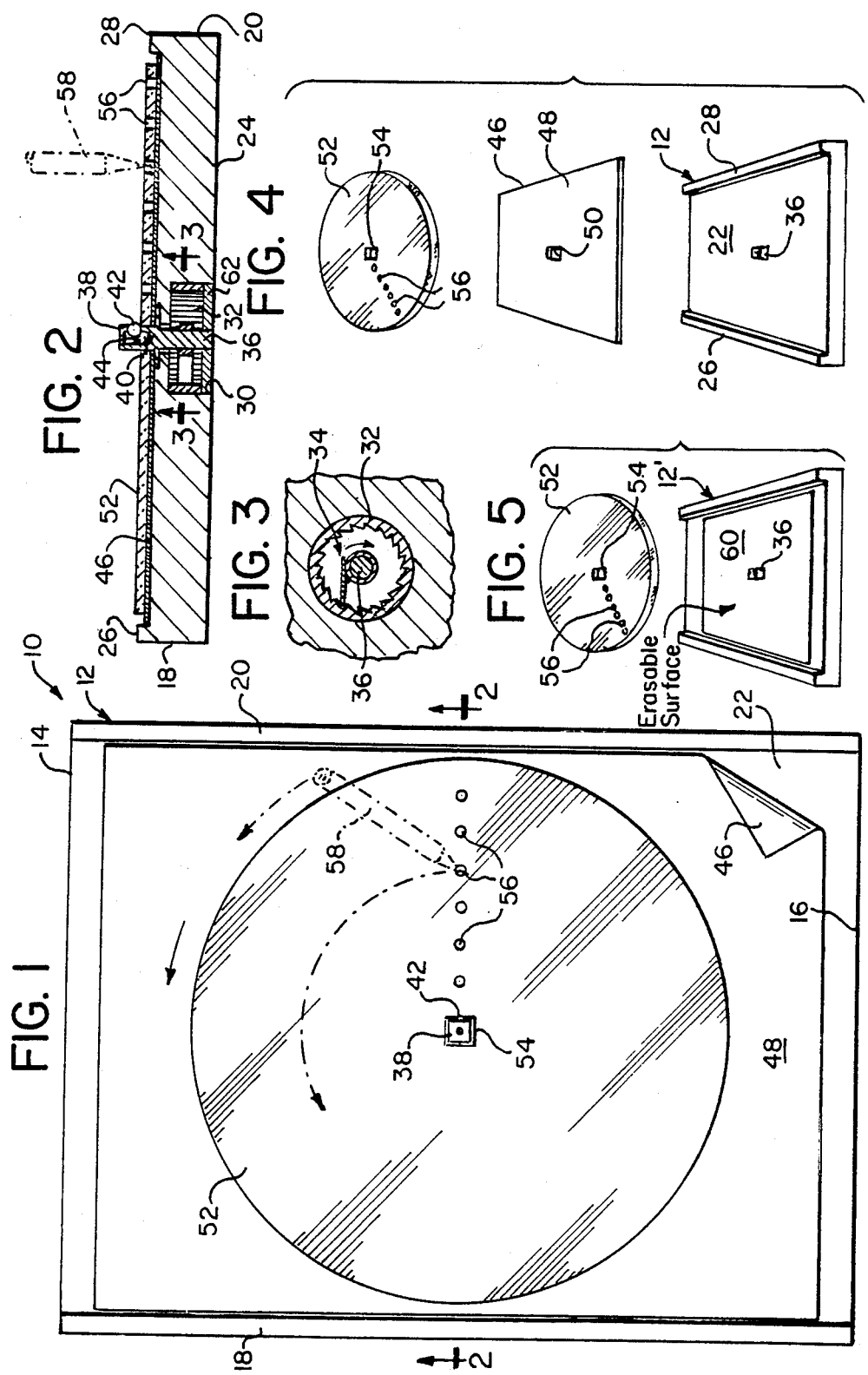

EDUCATIONAL APPLIANCE FOR TEACHING HANDWRITING SKILLS

BACKGROUND OF THE INVENTION

1. Field of the Invention

This invention related generally to an educational appliance for teaching handwriting skills and, more specifically, to a teaching aid designed to help children make circles in a counterclockwise direction necessary for correct letter formation.

2. Description of the Prior Art

It is known that children should be taught to draw circles in a counterclockwise direction. The reason for such instruction is that the child then will correctly form certain letters of the alphabet; such as, the letters "a", "c", "d", "e", "f", "g", "o", and "q" using a counterclockwise movement.

The objective of such handwriting instruction is to establish a motor pattern for writing which becomes so automatic that it is unnecessary to concentrate on the formation of individual letters while expressing ideas. It is important for the child to see what he or she is drawing or writing to develop visual-motor integration in working with writing utensils. The tools or materials selected for use should be of the kind from which good visual feedback can be obtained, and which permit the visual-motor patterns to be reinforced by repetition.

Heretofore, stencils and templates have been used as tools to reinforce the teaching techniques in drawing geometric shapes, and in writing various letters. Such tools, in conjunction with verbal instructions, help children establish visual-motor integration, and develop a smooth flow of writing. Children that are educationally handicapped, or have difficulty in visually comprehending the handwriting instruction, demonstrate good progress when taught to make the appropriate visual-motor associations.

The present invention improves on the aforesaid teaching techniques by providing a more durable and lasting device, as compare to known stencils and templates, which can be used as an adjunct to verbal or visual instructions.

SUMMARY OF THE INVENTION

The educational appliance of the present invention includes a planar tablet having a surface which supports thereon a sheet-like member having an inscribable surface. An overrunning clutch having a spindle is mounted to the tablet and is oriented to permit rotation of the spindle in a counterclockwise direction.

A rotatable planar disc is provided having a bore, which defines an axis of rotation, and a plurality of apertures spaced radially outward from the axis of rotation. The bore is configured to receive the spindle of the clutch to prevent any significant relative rotation therebetween, and to permit rotation of the disc only in a counterclockwise direction. The disc, thus, is removably mounted to the clutch, with the sheet-like member sandwiched between the planar tablet and the rotatable planar disc.

The apertures in the planar disc are configured to receive a writing implement, such as a pencil. In use, the child inserts the pointed end of the pencil through a selected one of the apertures in the disc, thereby to inscribe a circle on the inscribable surface of the supported sheet-like member during rotation of the disc about its axis of rotation. The disc is rotated by means of the manual manipulation of the pencil, thereby instilling a habit in the child of drawing circles in a counterclockwise direction.

In another embodiment of the invention, the sheet-like member may be eliminated. In place thereof, the planar tablet itself may be formed having an inscribable surface whereby the pencil inscribes a circle directly on the planar tablet upon rotation of the planar disc.

Additional features and advantages of the present invention will become more apparent from a consideration of the following detailed description when taken in conjunction with the accompanying drawings.

BRIEF DESCRIPTION OF THE DRAWINGS

FIG. 1 is a top plan view of the educational appliance constructed in accordance with the present invention;

FIG. 2 is a sectional view taken along line 2—2 of FIG. 1;

FIG. 3 is a sectional view taken along line 3—3 of FIG. 2;

FIG. 4 is an exploded perspective view of the assembled elements of the preferred embodiment of the invention; and FIG. 5 is an exploded perspective view of the assembled elements of an alternative embodiment of the invention.

DESCRIPTION OF THE PREFERRED EMBODIMENTS

Referring to the drawings, numeral 10 represents an educational appliance for use in teaching handwriting skills. Appliance 10 includes a planar tablet 12 having an upper edge 14, a lower edge 16, side edges 18 and 20, respectively, a top support surface 22 and a bottom surface 24. The side edges 18 and 20 project upwardly above the plane of support surface 22 to define raised flanges 26 and 28, respectively. The raised flanges serve as a guide for locating a sheet-like inscription member on said support surface in the manner hereinafter described.

A bore 30 is formed in tablet 12 defining an enlarged portion in the bottom surface 24 which extends upwardly for approximately two-thirds the height of the tablet, and then reduces in size at the top support surface 22 of said tablet. The enlarged portion of bore 30 is configured to receive an overrunning clutch 32. The clutch incorporates a ratchet mechanism represented, generally, by numeral 34 in FIG. 3. Activation of clutch 32 produces a clicking sound through operation of the ratchet mechanism 34 in a manner well known in the art.

Clutch 32 also includes a spindle 36 which is operatively connected to the ratchet mechanism 34 for rotation therewith. The ratchet mechanism 34 may be selectively oriented to permit rotation in either a clockwise or counterclockwise direction. For present purposes, the mechanism is set to permit orientation only in a counterclockwise direction. As such, the clutch 32 and its connected spindle 36 may be defined as being oriented for rotation only in a counterclockwise direction as viewed from the top; that is, in the direction of the arrow when viewed looking at FIG. 1.

Spindle 36 extends upwardly from clutch 32 and projects through the reduced sized portion of bore 30. This serves to locate the top or free end 38 of spindle 36 above the plane defined by support surface 22. The surface of spindle 36 adjacent its free end 38 is formed having an opening 40 configured to received an outwardly biased retractable bearing element 42. The element is normally displaced, under influence of a spring 44, to a projected position, as shown in FIG. 2, to releasably retain a separate rotatable member on said spindle 36 in a manner hereinafter described.

Supported on the top support surface 22 of tablet 12 is a sheet-like member 46, such as ordinary writing paper, having an inscribable surface 48. An enlarged opening 50 is formed in member 46 through which freely passes the spindle 36 of clutch 32 when member 46 is positioned on support surface 22. As previously noted, the raised flanges 26 and 28 of tablet 12 guide member 46 in place.

A rotatable member 52 in the form of a transparent planar disc is provided having an opening or bore 54 which defines an axis of rotation. Opening 54 is configured to permit passage of spindle 36 therethrough thereby to sandwich the writing sheet 46 between said disc 52 and tablet 12. A plurality of apertures 56 are provided in disc 52, each spaced radially outward from the axis of rotation. The apertures are aligned to be colinear.

Disc 52 is mounted to tablet 12 by locating the central bore opening 54 over the upwardly projecting spindle 36 of clutch 32. As the disc is lowered in place, the inner wall surface which defines said bore engages the bearing element 42 in spindle 36 and displaces said element to a retracted position against the force of spring 44. Thereafter, as the disc 52 moves past element 42, the element returns to its outwardly biased projected position. This serves to locate the outermost edge of element 42 in a position which overlies an edge portion of the disc which defines bore 54, as shown in FIG. 2, to releasably retain disc 52 in place on spindle 36.

It will be appreciated that it is intended for the disc 52 to be removably connected to clutch 32, by means of spindle 36, so that disc 52 rotates only in a counterclockwise direction. Accordingly, the central bore 54 in disc 52 is configured in such manner as to receive the spindle 36 and prevent any significant or relative rotation between said disc and said spindle. This is achieved by making the internal surfaces which define bore 54 of a shape complementary to the shape of the outer surfaces of spindle 36.

With the device thus assembled, it now is apparent that when a pencil 58, shown in phantom in FIG. 1, is inserted in a selected aperture 56 of disc 52, and is manually manipulated in the direction of the arrow to rotate disc 52 in a counterclockwise direction about its axis of rotation, a circle is inscribed on surface 48 of sheet 46. It further is apparent that since disc 52 is prevented from rotating in a clockwise direction due to the operative orientation of clutch 32, use of apparatus 10 serves to instill a habit in the child of drawing circles in a counterclockwise direction.

Various decorative designs can be made by the child when using the device. Specifically, the child can draw a plurality of concentric circles on sheet 46 dependent on which ones of the apertures 56 are selected for use. The transparency of disc 52 enables the child to see the circles being drawn, which thus adds to the satisfaction of the child in using the device.

Since the disc is capable of being rotated in only one direction, the device is, in effect, self-correcting. That is, rotation of the disc can only be in the counterclockwise direction which is necessary for correct letter formation.

The device provides positive visual feedback because the child can see the sheet with the circle, or ring of circles, drawn thereon. The child, thus, gets an accurate visual perception of the drawn figure, as well as a feeling of success.

The device also provides kinesthetic feedback of the desired movement of the disc. This is due to the fact that the device has varying degrees of resistance to rotation of the disc dependent on which one of the disc apertures is selected to receive the pencil point. This is because each aperture is located at a different radius or distance from the axis of rotation of the disc. It follows that for a disc of constant mass, the amount of force needed to rotate the disc to overcome the resistance of the clutch decreases as the radius of the selected aperture increases. To the child, the different forces needed to rotate the disc translates into different degrees of resistance which, thus, provide a sensorimotor feedback of the desired disc movement.

Still, further, the ratchet movement of the clutch provides auditory feedback, in the nature of a pleasant clicking sound, to convey to the child that the device is being used correctly. The clicking sound also delights younger children, and makes the activity of using the device fun.

In construction, tablet 12 may be formed of metal, plastic or wood. Transparent disc 52 may be formed of plastic. The dimensions of the device should be selected as to easy and comfortable for a child to use. For example, tablet 12 may be of rectangular shape having planar dimensions of approximately 12"×9"(30.48 cm×22.86 cm), and a height of 1" (2.54 cm). The height dimension includes the distance from bottom surface 24 to the top of the flanges 26, 28. The height of tablet 12 from the bottom surface to the top support surface is 0.875" (2.22 cm). The planar disc 52 may be approximately 8" in diameter (20.32 cm), and have a thickness of 0.125" (0.32 cm).

FIG. 5 shows an alternative embodiment of the invention in which the planar tablet 12' includes an erasable, inscribable surface 60, thereby eliminating the use of any sheet element 46. The operation of the device otherwise is the same as that previously disclosed. Specifically, when disc 52 is mounted in place on spindle 36, and pencil 58 is inserted in a selected disc aperture 56, rotation of said disc about its axis of rotation by manipulation of pencil 58 serves to inscribe a circle directly on surface 60 of tablet 12' in a counterclockwise direction.

A closure plate 62 may be included to fit within and cover bore 30 after clutch 32 is inserted in tablet 12.

While preferred embodiments of the invention have been shown and described in detail, it will be readily understood and appreciated that numerous omissions, changes and additions may be made without departing from the spirit and scope of the present invention.

I claim:

1. An educational appliance for teaching handwriting skills comprising:

a planar tablet having an inscribable surface;

an overrunning clutch mounted to said tablet, said clutch oriented to permit rotation in a counterclockwise direction;

a rotatable member having an axis of rotation and at least one aperture spaced radially outward from said axis of rotation, said aperture configured to receive a writing implement operable to inscribe a circle beneath said member as it rotates about said axis of rotation; and means for removably connecting said rotatable member to said clutch so that said member rotates only in a counterclockwise direction, thereby causing the writing implement which is received in said aperture to inscribe a circle on said inscribable surface of said tablet during rotation of said member by manual manipulation of the writing implement, and thereby instilling a habit in a user of drawing circles in a counterclockwise direction.

2. An educational appliance for teaching handwriting skills comprising:
   a planar tablet having a support surface, said surface adapted to receive and support thereon a sheet-like member having an inscribable surface;
   an overrunning clutch mounted to said tablet, said clutch oriented to permit rotation in a counterclockwise direction;
   a rotatable member having an axis of rotation and at least one aperture spaced radially outward from said axis of rotation, said aperture configured to receive a writing implement operable to inscribe a circle beneath said member as it rotates about said axis of rotation; and
   means for removably connecting said rotatable member to said clutch so that said member rotates only in a counterclockwise direction, thereby causing the writing implement which is received in said aperture to inscribe a circle on the inscribable surface of the sheet-like member during rotation of said member by manual manipulation of the writing implement, and thereby instilling a habit in a user of drawing circles in a counterclockwise direction.

3. The educational appliance of claim 2 wherein said rotatable member has a plurality of writing implement receiving apertures each spaced radially outward from said axis of rotation to permit a concentric set of circles to be inscribed only in a counterclockwise direction on the inscribable surface of the sheet-like member.

4. The educational appliance of claim 3 wherein said plurality of writing implement receiving apertures are colinear.

5. The educational appliance of claim 2 wherein said rotatable member comprises a planar disc.

6. The educational appliance of claim 2 wherein said rotatable member is transparent.

7. The educational appliance of claim 2 wherein said tablet has raised flanges adjacent edge portions of said support surface, said flanges serving as a guide for locating the sheet-like inscription member on said support surface.

8. The educational appliance of claim 2 wherein said connecting means comprises an extending spindle connected to said clutch for rotation therewith, said rotatable member being releasably mounted to said spindle to prevent relative rotation therebetween.

9. The educational appliance of claim 8 wherein said tablet has a bore communicating with said support surface, said clutch being located within said bore with the free end of said spindle projecting above said support surface, and wherein said appliance further comprises a closure plate configured to fit within and cover said bore.

10. The educational appliance of claim 9 wherein said spindle has a set of surfaces, and said rotatable member has a bore defined by complementary shaped surfaces configured to receive said spindle and to prevent relative rotation therebetween.

11. The educational appliance of claim 10 wherein said spindle has an outwardly biased retractable bearing element projecting from one of said surfaces thereof, said element being movable between a projected position and retracted position, the bore of said rotatable member being configured to engage said element upon mounting of said member on said spindle to displace said element to its retracted position, whereupon when said member is moved past said element, said element returns to its outwardly biased projected position and overlies an edge portion defining said bore to releasably retain said member in place on said spindle.

12. An educational appliance for teaching handwriting skills comprising:
   a planar tablet having a support surface;
   a sheet-like member supported on said tablet, said member having an inscribable surface;
   an overrunning clutch mounted to said tablet, said clutch oriented to permit rotation in a counterclockwise direction;
   a rotatable member having an axis of rotation and at least one aperture spaced radially outward from said axis of rotation, said aperture configured to receive a writing implement operable to inscribe a circle beneath said rotatable member as it rotates about said axis of rotation; and
   means for removably connecting said rotatable member to said clutch so that said member rotates only in a counterclockwise direction thereby causing the writing implement which is received in said aperture to inscribe a circle on said inscribable surface of said sheet-like member during rotation of said member by manual manipulation of the writing implement, and thereby instilling a habit in a user of drawing circles in a counterclockwise direction.

13. The educational appliance of claim 12 wherein said connecting means comprises an extending spindle connected to said clutch for rotation therewith, said rotatable member being releasably mounted to said spindle to prevent relative rotation therebetween.

14. The educational appliance of claim 13 wherein said sheet-like member has an opening therein configured larger than the cross-sectional dimensions of said spindle to permit said spindle to extend freely therethrough when said sheet-like member is supported on said tablet.

15. The educational appliance of claim 12 wherein said tablet has a recessed bore configured to receive said clutch therein, and said appliance further comprises a closure plate configured to fit within and cover said bore.

16. An educational appliance for teaching handwriting skills comprising:
   a planar tablet having a support surface adapted to receive and support thereon a sheet-like member having an inscribable surface;
   an overrunning clutch mounted to said tablet, said clutch oriented to permit rotation in a counterclockwise direction;
   an extending spindle connected to said clutch for rotation therewith, the free end of said spindle projecting above said support surface and having a set of surfaces;
   a rotatable planar disc having a bore which defines an axis of rotation and at least one aperture spaced radially outward from said axis of rotation, said aperture configured to receive a writing implement operable to inscribe a circle beneath said disc as it rotates about said axis of rotation; and said bore having complementary shaped surfaces configured to receive said spindle to permit said disc to be removably connected to said spindle and prevent relative rotation therebetween, and to permit rotation of said disc only in a counterclockwise direction, thereby causing the writing implement which is received in said aperture to inscribe a circle on the inscribable surface of the sheet-like member during rotation of said disc by manual manipulation of the writing implement, and thereby instilling a habit in a user of drawing circles in a counterclockwise direction.

17. The educational appliance of claim 16 wherein said disc has a plurality of aligned writing implement receiving apertures spaced radially outward from said axis of rotation to permit a concentric set of circles to be inscribed on the inscribable surface of the sheet-like member.

18. The educational appliance of claim 16 wherein said disc is transparent.

19. The educational appliance of claim 16 wherein said spindle has an outwardly biased retractable bearing element projecting from one of said surfaces thereof, said element being movable between a projected position and a retracted position, the bore of said rotatable disc being configured to engage said element upon mounting of said disc on said spindle to displace said element to its retracted position, whereupon when said disc is moved past said element, said element returns to its outwardly biased projecting position and overlies an edge portion defining said bore to releasably retain said disc in place on said spindle.

20. The educational appliance of claim 16 wherein said tablet has a recessed bore configured to receive said clutch therein, and said appliance further comprises a closure plate configured to fit within and cover said bore.

* * * * *